US011023937B2

(12) United States Patent
Phillips et al.

(10) Patent No.: US 11,023,937 B2
(45) Date of Patent: Jun. 1, 2021

(54) VALIDATION AND OPTIMIZATION IN AN ONLINE MARKETING PLATFORM FOR HOME SELLERS

(71) Applicant: Graphic Language, Inc., San Francisco, CA (US)

(72) Inventors: Alexandria Phillips, Oakland, CA (US); Richard Phillips, Oakland, CA (US)

(73) Assignee: Zillow, Inc., Seattle, WA (US)

( * ) Notice: Subject to any disclaimer, the term of this patent is extended or adjusted under 35 U.S.C. 154(b) by 920 days.

(21) Appl. No.: 14/970,208

(22) Filed: Dec. 15, 2015

(65) Prior Publication Data

US 2016/0132945 A1 May 12, 2016

Related U.S. Application Data

(63) Continuation-in-part of application No. 12/904,828, filed on Oct. 14, 2010, now abandoned.

(60) Provisional application No. 62/093,384, filed on Dec. 17, 2014, provisional application No. 61/257,796, filed on Nov. 3, 2009.

(51) Int. Cl.
*G06Q 30/06* (2012.01)
*G06Q 50/16* (2012.01)

(52) U.S. Cl.
CPC ......... *G06Q 30/0601* (2013.01); *G06Q 50/16* (2013.01)

(58) Field of Classification Search
CPC ....... G06Q 50/16; G06Q 50/167; G06Q 30/06
See application file for complete search history.

(56) References Cited

U.S. PATENT DOCUMENTS

| 2004/0059586 | A1* | 3/2004 | Brimberry | G06Q 30/02 |
| | | | | 705/26.1 |
| 2004/0098269 | A1* | 5/2004 | Wise | G06Q 30/02 |
| | | | | 705/313 |
| 2004/0226002 | A1* | 11/2004 | Larcheveque | G06F 40/174 |
| | | | | 717/126 |
| 2005/0091218 | A1* | 4/2005 | Janes | G06Q 30/00 |
| 2006/0031255 | A1* | 2/2006 | Carolan | G06Q 30/06 |
| 2007/0050342 | A1 | 3/2007 | Inkinen et al. | |
| 2007/0198466 | A1* | 8/2007 | Sullivan | G06Q 30/08 |

(Continued)

OTHER PUBLICATIONS

RealBird [(www.realbird.com) retrieved from the Internet Archive Wayback machine dated Oct. 5, 2008 and Oct. 11, 2008] pp. 1-9.*

(Continued)

*Primary Examiner* — Gabrielle A McCormick
*Assistant Examiner* — Maame Ofori-Awuah
(74) *Attorney, Agent, or Firm* — Perkins Coie LLP

(57) ABSTRACT

A technology for providing validation and optimization for listings on an online marketing platform for home sellers is described. In some embodiments, the disclosed technology provides a validation tool for users of the online marketing platform to quality check the users' home feeds in real-time through a graphical user interface of the online marketing platform. In some embodiments, the disclosed technology provides an optimizer tool for the users to optimize the users' home feeds through a graphical user interface of the online marketing platform. The users of the online marketing platform can be home sellers, which can include, for example, home builders, brokers, and their agents.

24 Claims, 13 Drawing Sheets

(56) References Cited

U.S. PATENT DOCUMENTS

| | | | |
|---|---|---|---|
| 2007/0233565 A1 | 10/2007 | Herzog et al. | |
| 2007/0263648 A1 | 11/2007 | Driver | |
| 2008/0222010 A1* | 9/2008 | Hudak | G06Q 30/02 705/27.1 |
| 2009/0063232 A1* | 3/2009 | Lissack | G06Q 10/063116 705/7.21 |

OTHER PUBLICATIONS

L. Lin and C. Huang, "An Integrated Information System for Real Estate Agency Based on Service-Oriented Architecture," 2008 IEEE International Symposium on Service-Oriented System Engineering, Jhongli, 2008, pp. 184-189, doi: 10.1109/SOSE.2008.52 (Year: 2008).*
Final Office Action dated Apr. 25, 2013 for U.S. Appl. No. 12/904,828 of Phillips, A. et al filed Oct. 14, 2010.
Final Office Action dated Jun. 30, 2015 for U.S. Appl. No. 12/904,828 of Phillips, A. et al filed Oct. 14, 2010.
Non-Final Office Action dated Dec. 15, 2014 for U.S. Appl. No. 12/904,828 of Phillips, A. et al filed Oct. 14, 2010.
Non-Final Office Action dated Sep. 20, 2016 for U.S. Appl. No. 12/904,828 of Phillips, A. et al filed Oct. 14, 2010.
Non-Final Office Action dated Sep. 26, 2012, for U.S. Appl. No. 12/904,828 of Phillips, A. et al filed Oct. 14, 2010.
Non-Final Office dated Apr. 22, 2014 for U.S. Appl. No. 12/904,828 of Phillips, A. et al filed Oct. 14, 2010.
U.S. Appl. No. 12/904,828 of Phillips, A. et al filed Oct. 14, 2010.
RealBird, www.realbird.com, [retrieved on Sep. 1, 2016], Retrieved from the Internet Archive Wayback machine: <<http://web.archive.org/web/20081011105504/http:i /www.realbird.com/ListingPublisher-Presentation-Features.aspx>>, Oct. 5 & 11, 2008, 9 pages.
ListingDomains.com from archive.org, Feb. 2009, 1 page.

* cited by examiner

```xml
<Builders DateGenerated="2015-07-29T07:06:31Z">
    <Corporation>
        <CorporateBuilderNumber>NHF</CorporateBuilderNumber>
        <CorporateState>CA</CorporateState>
        <CorporateName>NewHomeFeed</CorporateName>
        <Builder>
            <BuilderNumber>1062</BuilderNumber>
            <BrandName>ABY Construction Inc</BrandName>
            <ReportingName>ABY Construction Inc</ReportingName>
            <DefaultLeadsEmail LeadsPerMessage="All">abyconstruction01@gmail.com</DefaultLeadsEmail>
            <Subdivision Status="Active" PriceLow="295000" PriceHigh="305000" SqftLow="2774" SqftHigh="2774">
                <SubdivisionNumber>18188</SubdivisionNumber>
                <SubdivisionName>Turtle Creek Subdivision</SubdivisionName>
                <UseDefaultLeadsEmail>0</UseDefaultLeadsEmail>
                <SubLeadsEmail>leads+id-18188-type-1-src-6@newhomefeed.org</SubLeadsEmail>
                <SalesOffice>
                    <Address OutOfCommunity="0">
                        <Street1>9945 Turtle Creek Ln S</Street1>
                        <City>Mobile</City>
                        <State>AL</State>
                        <ZIP>36695</ZIP>
                        <Geocode>
                            <Latitude>30.643459400000</Latitude>
                            <Longitude>-88.278739200000</Longitude>
                        </Geocode>
                    </Address>
                    <Phone>
                        <AreaCode>251</AreaCode>
                        <Prefix>401</Prefix>
                        <Suffix>3654</Suffix>
                        <Extension/>
                    </Phone>
                    <Email>abyconstruction01@gmail.com</Email>
                </SalesOffice>
                <DrivingDirections/>
                <Schools>
                    <DistrictName LEAID="0102370">MOBILE COUNTY</DistrictName>
                    <Elementary NCESID="010237001813">
                        <![CDATA[ O'ROURKE ELEM SCH ]]>
                    </Elementary>
                </Schools>
                <Schools>
                    <DistrictName LEAID="0102370">MOBILE COUNTY</DistrictName>
                    <High NCESID="010237000899">
                        <![CDATA[ BAKER HIGH SCH ]]>
                    </High>
                </Schools>
                <Utility Type="Gas">
                    <UtilityName>Alabama Utilities</UtilityName>
                </Utility>
                <SubDescription>
A gorgeous home under construction 2015. This home has 4 bedroom, one study room with vault ceiling, bonus room with sound proof wall and 3 bathroom. 14 ft Soaring ceilings in the dining room and 11 ft ceiling in living room and foyer. Also has formal dining room, breakfast bar, granite countertops, wall oven, gas cooktop, HUGE corner pantry, large breakfast room. Master bedroom is spacious with tray ceiling, his closets, dual vanity, separate shower with seat, Garden tub, four recessed light and separate water closet. Living room has gas fireplace with remote. Heavy trim all over the house. Beautiful custom cabinet with ivory paint and black flash. Exterior is mix or stone, brick and Hardie board. Nice back patio, privacy fenced backyardl, and double garage complete this fantastic home
                </SubDescription>
                <SubImage ReferenceType="URL" Type="Standard" SequencePosition="1" Title="" Caption="">
                    ...
```

*FIG. 5*

| | | 712 | 710 | | | 700 |
|---|---|---|---|---|---|---|
| ▼ Montecito at Riog... | Lone Tree, CO | $527,950 to $622,950 | Active | ⊙⊙ | 💬 | 12/03/2014 |
| ⊞ Residence 7345 | | $527,950 | Active | ⊙⊙ | 💬 | 07/14/2014 |
| ⊞ Residence 7445 | | $537,950 | Active | ⊙⊙ | 💬 | 07/14/2014 |
| ⊞ Residence 7545 | | $577,950 | Active | ⊙⊙ | 💬 | 07/14/2014 |
| ⊞ Residence 7640 | | $552,950 | Active | ⊙⊙ | 💬 | 07/14/2014 |
| ⊞ Residence 7745 | | $582,950 | Active | ⊙⊙ | 💬 | 07/14/2014 |
| ⊟ Residence 7845 | | $597,950 | Active | ⊙⊙ | 💬 | 07/14/2014 |
| ├ 10505 Montecito Drive | | $705,691 | Inactive | ⊙⊙ | | 02/19/2013 |
| Stories. Must be a minimum of 1. | | $774,950 | Active | ⊙⊙ | | 08/21/2014 |
| ├ 10583 MONTECITO DRIVE | | $719,950 | Inactive | ⊙⊙ | | 10/22/2013 |
| ├ 10600 Ladera Drive | | $717,940 | Active | ⊙⊙ | | 12/09/2011 |
| ├ 10600 Ladera Drive | | $769,935 | Active | ⊙⊙ | | 12/03/2014 |
| ├ 10505 Montecito Drive | | $690,078 | Inactive | ⊙⊙ | | 01/21/2011 |
| ├ 10658 Alcante Road | | $697,080 | Active | ⊙⊙ | | 12/03/2014 |
| ⊞ Residence 7916 | | $622,950 | Active | ⊙⊙ | 💬 | 07/11/2011 |
| ▶ Outlook Pointe--New.. | Brighton, CO | $254,950 to $289,950 | Active | ⊙⊙ | 💬 | 12/03/2014 |

| General Info | Images (0) | Videos (0) | Testimonials (0) | Amenities (0) | Services (0) | Utilities (0) | Schools (0) |

Update Community
In this section, enter basic community information commonly accepted by listing websites that feature communities. This information includes details about your community such as location, price, area information, amenities, schools, sales office info, utilities, and more. Not all of the information is required but adding more will promote your communities more effectively to your buyers. HINT: Try to fill out as much as you can!

*Indicates required field          💾 Save

The Basics

Community Name*
[TEST]

Street Address 1*
[TESTTEST]                    — 804

Street Address 2
[            ]

City*            State*            Zip*
[Fresno]         [California ▾]    [93720]

Details

Comm. ID
[7607]

Marketing Status
[- Select -          ▾]

Price Low*     Price High*
[100]          [200]

Sq. Ft. Low*   Sq. Ft. High*
[100]          [200]

Leads Email
[            ]

Community Website URL
[            ]

Description / Characters left: 1500
[            ]

Cast A Wider Net!

Drive more quality traffic to your website, get more actionable conversions, and give your listings more prominence with paid advertising strategies. New Home Feed's PAID network of thoroughly researched home-listing websites ensures your listings get higher placement and more home-browsing eyes.

NOTE: Your Listings may take up to 48 hours to go live.

| Listing Website | Assigned | Pricing | Traffic | Coverage |
|---|---|---|---|---|
| Active Adult Living Enhanced | 0 | Request a quote | 80K | National |
| Facebook Listings | 0 | Request a quote | | National |
| Homes.com Enhanced | 0 | Request a quote | | National |
| Juwai | 0 | Request a quote | 2.5 Million Monthly Unique Visitors | International |
| Mobile Listings | 0 | Request a quote | | National |
| New Condos Online | 0 | Request a quote | 100K | National |
| New Home Feed Banner Network | 0 | Request a quote | | |
| New Home Guide | 0 | Request a quote | 58K | National |
| New Homes Directory | 0 | Request a quote | | National |
| New Homes Guide | 0 | Request a quote | | DE, MD, VA, PA, NC |
| NWhomes.com | 0 | Request a quote | | Pacific North-West |
| San Diego Tribune | 0 | Request a quote | 4 Million Unique users | Southern California |

*FIG. 9*

VALIDATION AND OPTIMIZATION IN AN ONLINE MARKETING PLATFORM FOR HOME SELLERS

CROSS-REFERENCE TO RELATED APPLICATION

This application is a continuation in part of U.S. Provisional Patent Application No. 62/093,384 entitled, "VALIDATION AND OPTIMIZATION IN AN ONLINE MARKETING PLATFORM FOR HOME SELLERS," filed Dec. 17, 2014, and U.S. patent application Ser. No. 12/904,828 entitled, "ONLINE MARKETING PLATFORM FOR HOME SELLERS," filed Oct. 14, 2010, which claims the benefit of U.S. Provisional Patent Application No. 61/257,796 entitled, "ONLINE MARKETING PLATFORM FOR HOME SELLERS," filed Nov. 3, 2009, contents which are incorporated herein by reference for all purposes in their entirety.

BACKGROUND

Home sellers (e.g., builders, brokers, and their agencies) typically go to multiple online advertising sources (listing websites) to add or update their home inventory (e.g., price changes, new offers, additions, deletions, Q/A's, etc.). This requires a significant investment of time and money. Moreover, as many of the websites that provide listing functionality have uniquely different protocols for listing new homes, the learning curve is steep.

Another problem home sellers experience with many listing websites is that they are often kept at the listing website and not directed to the builder's website. In general, the builder's website provides more comprehensive information about its own home products and is usually where purchase decisions are made, such as signing up on an interest list/mailing list. However, online listing services are inclined to keep visitors on their websites to improve their traffic reports and take credit for any meaningful actions taken by prospective buyers, such as clicking a specific floor plan, planning a community visit, or filling out a form.

Furthermore, because listing websites rarely have access to a builder's website files, functions like lead management, communications, reporting, and conversion tracking are not available, though many will claim to offer this functionality. On the other hand, home builders themselves rarely have access to the listing websites. As such, home builders may not have the ability to correct any errors that may show up in their listings at the different websites.

BRIEF DESCRIPTION OF THE DRAWINGS

FIG. 5 depicts a screenshot of an example XML file for a home feed.

FIG. 7 depicts a screenshot illustrating a user interface for detecting errors in listings by use of a validation engine.

FIGS. 8A-D depict screenshots of data input for generating property listings.

FIG. 9 depicts a screenshot of a property listing service selection interface.

DETAILED DESCRIPTION

Figure 1:
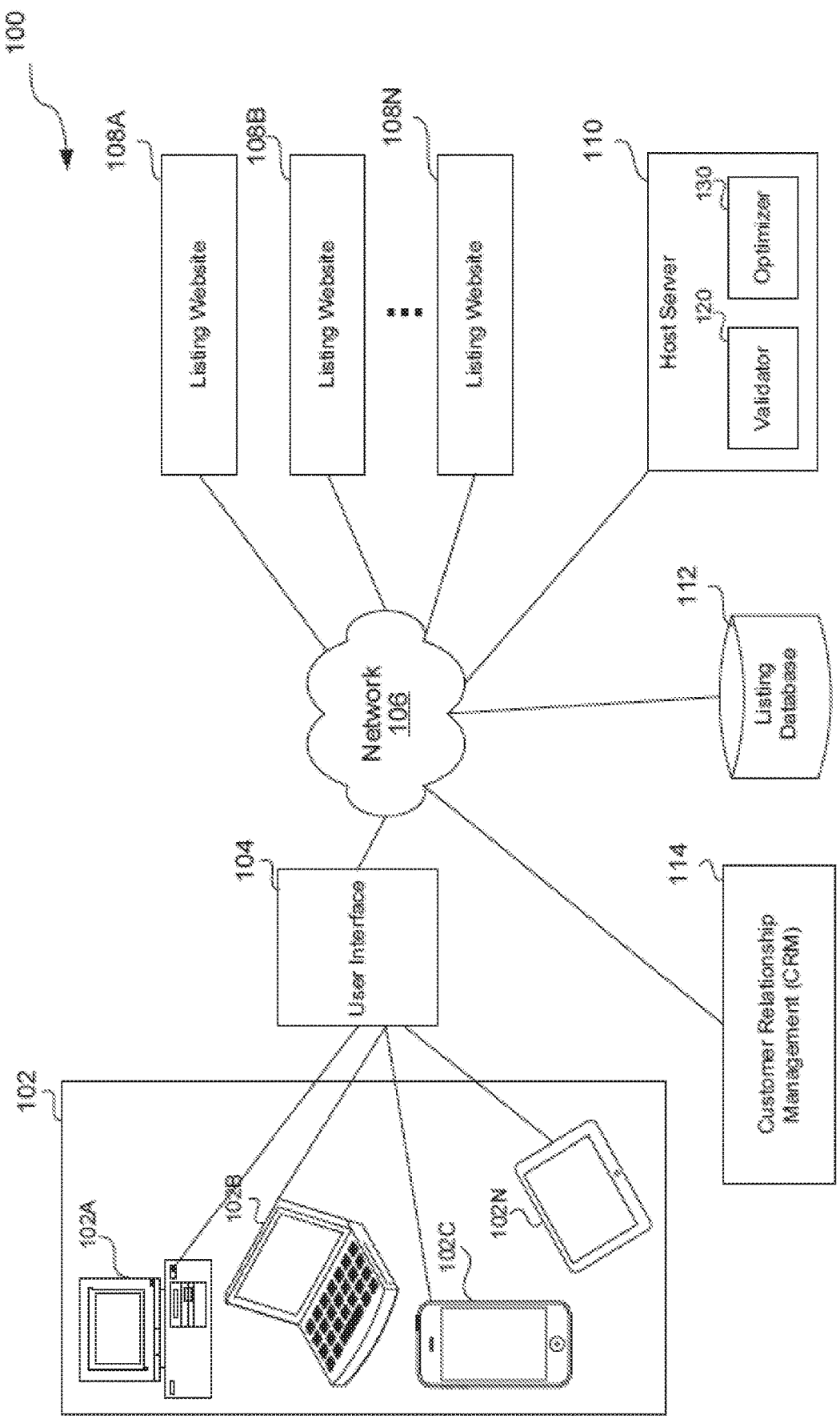
FIG. 1 illustrates a block diagram of client devices though which home sellers (e.g., builders and agents) can utilize the online marketing platform provided by the host server over a network.

Disclosed is a technology for validating and optimizing listings on an online marketing platform for home sellers ("the disclosed technology"). In some embodiments, the disclosed technology provides a validation tool for users of the online marketing platform to quality check the users' home feeds in real-time through a graphical user interface of the online marketing platform. In some embodiments, the disclosed technology provides an optimizer tool for the users to optimize the users' home feeds through a graphical user interface of the online marketing platform. The users of the online marketing platform can be home sellers, which can include, for example, home builders, brokers, and their agents. As used here, the term "home feeds" refers to a compilation, or listing, of users' for-sale homes listed on one or more listing channels (e.g., Zillow®, Trulia®, etc.) through the online marketing platform.

The validation tool operates as a quality assurance tool that allows a user (e.g., a home builder) to intuitively look at the user's XML feed to identify issues in the feed, without having to deal with the complications of the hundreds, if not thousands, of lines of code of the XML feed. Traditionally, listing channels merely provide a venue for posting listings and alert home builders if there are issues with any of the listings, but do not provide the details of such issues. Home builders, as a result, have to perform themselves the cumbersome task of examining the raw code of their XML files in order to determine what exactly needs to be fixed to address those errors. Consequently, a home builder has to be a relatively savvy programmer to understand the code in order to see what is wrong and needs to be corrected. Alternatively, home builders can expend money to hire a team of IT experts to handle the troubleshooting of the broken XML feeds. Furthermore, the IT team needs a customized system to manage all the different feeds separately. As such, even if the IT team is able to do the troubleshooting, it's highly burdensome and costly. Accordingly, under the traditional approach, validating XML feeds can be time-consuming, inefficient, and expensive.

In contrast to the traditional infrastructure, the validation tool in accordance with the disclosed technology provides a visually intuitive presentation of all home listings listed by a particular home builder, where the presentation includes alerts to notify the particular home builder of the errors associated with the home listings. In particular, the validation tool monitors the home listings to automatically detect any errors in the plans and/or homes in a particular community managed by the home builder. The home builder can easily view the errors by engaging (e.g., mouse-click) with any of the visually presented alerts. For example, the home builder can see where a particular plan has an error such as leaving a text field for floors blank because a minimum of one story is needed for every house. Accordingly, the home builder in this example is able to identify not only that there is an error with his listing, but also what exactly needs to be fixed to remove that error.

In addition to the validation tool, the disclosed technology includes an optimization tool that enables a user of the online marketing platform (e.g., a home builder) to optimize his feed. Similar to the validation tool, the optimization tool provides a visually intuitive presentation of recommendations that would improve a listing ranking at one or more listing channels. The optimization tool generates an alert next to a particular listing, and the user can engage with that alert to find out what could be optimized. For example, the alert recommends adding photos to a particular listing, as having more photos would result in a higher placement on particular listing channels (e.g., Trulia® and Zillow®).

Among other benefits, the disclosed technology provides a platform system that enables listing of properties to various multiple listing channels, as well as management of the listings at the various multiple listing channels. For example, updated communities, floor plans, home details, etc., can be published at once to all of the different channels from one place (i.e., the platform system). The platform system also enables transparent reporting and marketing, validation of the listings at the various multiple listing channels, and optimization at each of the listing channels. Accordingly, the platform system provides a simple, user-friendly, efficient, and cost-effective solution for all listing needs of a user, such as a home builder, thereby relieving the user of the cumbersome and complex task of dealing with the complicated XML feeds involving hundreds or thousands of lines of code.

The following description and drawings are illustrative only and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment; such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions provided herein, will control.

FIG. 1 illustrates a block diagram of client devices 102A-N though which home sellers (e.g., home builders) can utilize the online marketing platform provided by the host server 110 over a network 106.

The client devices 102A-N can be any system and/or device, and/or any combination of devices/systems, that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a computer cluster, and/or a mobile computing device such as a notebook, a laptop computer, a handheld computer, a mobile phone, a smart phone, a PDA, a Blackberry device, a Treo, and/or an iPhone, etc. In one embodiment, the client devices 102A-N are coupled to a network 106. In some embodiments, the client devices may be connected to one another.

The network 106, over which the client devices 102A-N couple, may be a telephonic network, an open network, such as the Internet, or a private network, such as an intranet and/or the extranet. For example, the Internet can provide file transfer, remote log in, email, news, RSS, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices and/or the host server, and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system that operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed that the network 106 broadly includes anything from a minimalist coupling of the components illustrated in the example of FIG. 1 to every component of the Internet and networks coupled to the Internet.

In addition, communications can be achieved via one or more wireless networks, such as, but not limited to, one or more of a local area network (LAN), a wireless local area network (WLAN), a personal area network (PAN), a campus area network (CAN), a metropolitan area network (MAN), a wide area network (WAN), a wireless wide area network (WWAN), Global System for Mobile Communications (GSM), personal communications service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General Packet Radio Service (GPRS), enhanced GPRS, or messaging protocols such as TCP/IP, SMS, MMS, extensible messaging and presence protocol (XMPP), real time messaging protocol (RTMP), instant messaging and presence protocol (IMPP), instant messaging, USSD, or IRC, or any other wireless data networks or messaging protocols.

The client devices 102A-N can be coupled to the network (e.g., Internet) via a dial-up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The listings database 112 stores software, descriptive data, images, system information, drivers, and/or any other data item utilized by parts of the host server 110 (e.g., NewHomeFeed.com) for operation. The listings database 112 may also store seller information, account information, listing information including, but not limited to, user inventory data, amenities, location, pricing information, pricing trends, seller profile (e.g., builder information, agent information), etc. The listings database 112 may be managed by a database management system (DBMS), for example, but not limited to, Oracle, DB2, Microsoft Access, Microsoft SQL Server, PostgreSQL, MySQL, FileMaker, MongoDB, CouchDB, Tokyo Cabinet, etc.

The listings database 112 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

The host server 110 is, in some embodiments, able to communicate with client devices 102A-N and the listing websites 108A-N over the network 106. In addition, the host server 110 is able to retrieve data from and/or store data in the listings database 112.

The listing websites 108A-N operate computer systems that are coupled to the network 106, which can communicate with the host server 110 and/or the client devices 102A-N. Users of client devices 102A-N, such as home sellers (e.g., builders or agents) can use client devices 102A-N to upload listings and/or update listings information. This information can be directly uploaded via the home seller's own website or through the host (NewHomeFeed.com). In some instances, when the home seller uploads or updates information via its own site, the information can be automatically pushed to the listing websites 108A-N. Listing websites 108A-N can include newspapers, magazine sites, and sites exclusively used for listing homes or properties on the market, including, but not limited to, NewHome Source, SFGate, move.com, Trulia®, Zillow®, realtor.com, etc.

The host server 110, in some embodiments, can recommend listing websites 108A-N (e.g., free sites and/or paid sites) to the home seller based on the listing information provided. The host server 110 can recommend regional or local listings sites for the home seller to select from, based on, for example, the geographical location of the listings. Once the home seller has selected the sites, the host server 110 can facilitate pushing the listing information to the sites. The host server 110 can also facilitate account setup of the home seller with any paid sites for transaction of fees. These processes are described with further reference to the example flow charts of FIGS. 2-4.

In one embodiment, the host server 110 communicates with a CRM manager 114, for example, over the network 106. The CRM manager 114 can manage leads and customers for the host server 110 such that the home sellers and/or the host can manage the customers after the sale. The CRM manager 114 can, in some instances, track and maintain lead information for the host server 110. In addition, the host server 110 can track and manage lead information internally, for use in pre-sales and/or post-sales.

In some embodiments, the host server 110 includes a validator engine 120 and an optimizer engine 130. The validator engine 120 operates as a quality assurance tool that allows a user (e.g., a home builder) to intuitively look at the user's XML feed to identify issues in the feed, without having to deal with the complications of the hundreds, if not thousands, of lines of code of the XML feed. The validator engine 120 provides a visually intuitive presentation of all home listings listed by a particular home builder, where the presentation includes alerts to notify the particular home builder of the errors associated with the home listings. In particular, the validator engine 120 monitors the home listings to automatically detect any errors in the plans and/or homes in a particular community managed by the home builder. The home builder can easily view the errors by engaging (e.g., mouse-click) with any of the visually presented alerts. Accordingly, the home builder is able to identify not only that there is an error with his listing, but also what exactly needs to be fixed to remove that error.

In some embodiments, the validator engine 120 generates an array of rules and specifications. In some embodiments, the rules and specifications are guided based on an analysis of trends detected that generally create errors in the listings on particular listing channels. In such embodiments, the primary causes of issues, or errors, are identified. In some embodiments, the rules and specifications are guided by certain listing channels (e.g., listing channels most utilized by the users) that have specified certain requirements for listing at their channels. In some embodiments, the validator engine 120 determines what would be considered a "highest quality" listing for a particular listing channel as a preventive measure for potential errors of those particular listings at that particular listing channel. In some embodiments, the rules and specifications are guided by both the requirements of the listing channels and the analyzed trends.

The rules and specifications are then applied across the board to all listings, including, for example, the communities, the residences, and the plans listed by the home buyers. An example rule or specification includes defining that a community listing needs an email address. Based on that rule/specification, the validator engine 120 validates whether the email address exists and whether that email address is a valid email address. Upon application of the rules and specifications, errors are automatically detected and displayed for each user at his/her respective dashboard.

The optimizer engine 130 enables a user of the online marketing platform (e.g., a home builder) to optimize his feed. Similar to the validation tool, the optimization tool provides a visually intuitive presentation of recommendations that would improve a listing ranking at one or more listing channels. The optimization tool generates an alert next to a particular listing, and the user can engage with that alert to find out what could be optimized. For example, the alert could recommend adding photos to a particular listing, as having more photos would result in a higher placement on particular listing channels (e.g., Trulia® and Zillow®).

The optimizer engine 130 helps users, such as home builders, to optimize their listings to be of high quality or even the highest possible quality. Optimizing listings benefits the user because listings of the highest quality on the network get higher organic placement within each listing directory and lead to improved SEO (search engine optimization).

In some embodiments, the optimizer engine 130 first examines the data specifications for listing a home. The data specifications can be customized by the online marketing platform based on trends observed at different listing channels. The data specifications can also be based on default data specifications used generally by home builders in the marketplace for listing new homes. The optimizer engine 130 next determines, for a particular user (e.g., a home builder), what attributes are needed in the particular user's listings to make those listings be considered "high quality" at the various listing channels. In some embodiments, the optimizer engine 130 examines the existing attributes of the listings and compares them with the attributes of each of the listing channels to define what constitutes a high-quality listing. In such embodiments, examination of each listing channel ensures that a particular listing would be ranked highest at each of the listing channels on which it appears. For example, the listing website homes.com uses different attributes from Zillow® or Trulia® to rank listings. In some embodiments, the optimizer engine 130 determines the minimum information needed for each listing (e.g., home or community), or the minimum required attributes to make a listing of decent quality, not necessarily of the highest quality. A high-quality listing is a listing that would be ranked highly at a particular listing channel. Ultimately, the optimizer engine 130 strives to help users create the best possible data set (of attributes) for each community, each home, or each plan listed.

Figure 2:
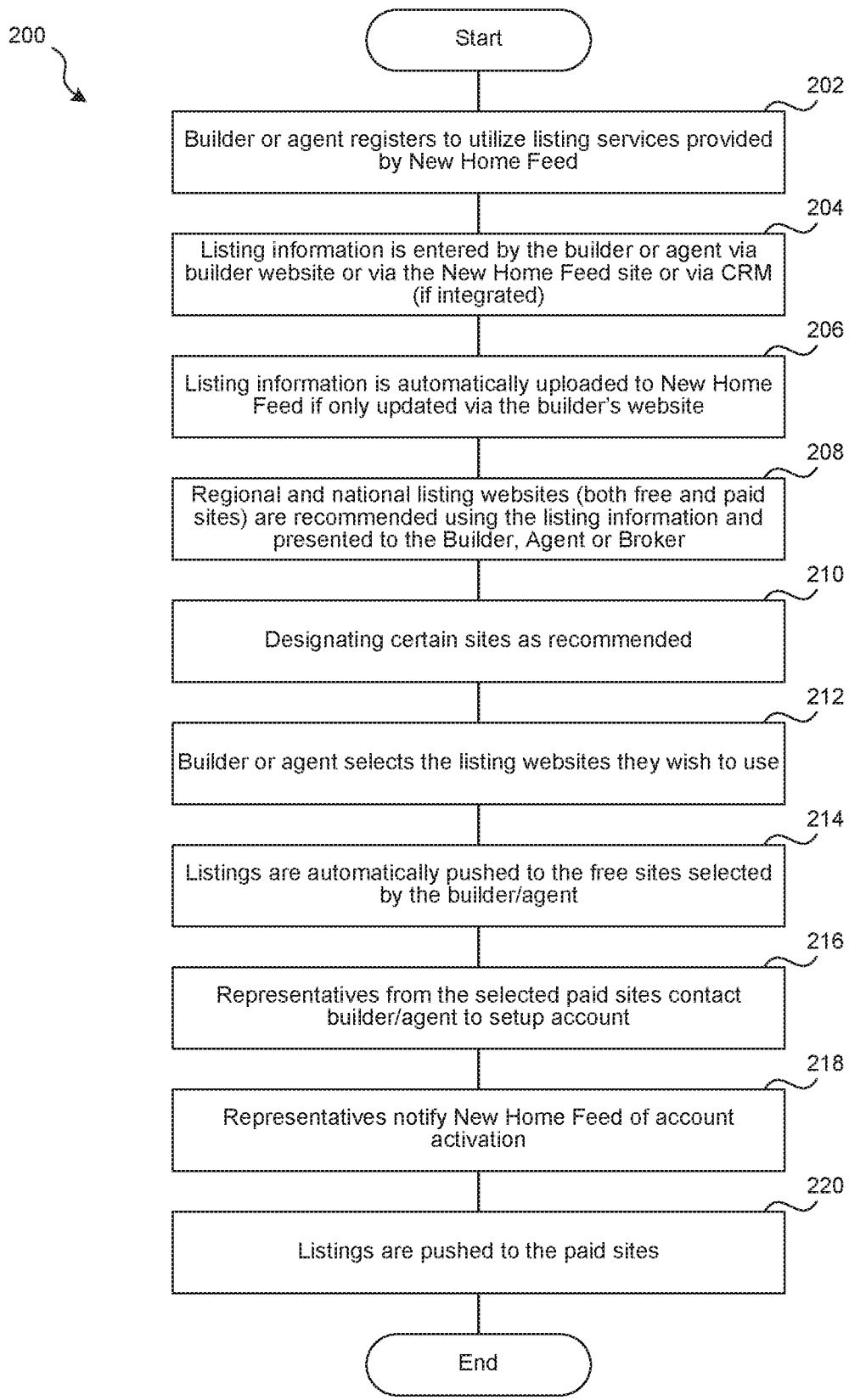
FIG. 2 depicts a flow chart showing an example process for a home seller to list homes on multiple listing websites through the host site.

FIG. 2 depicts a flow chart showing an example process for a home seller to list homes on multiple listing websites through the host site (New Home Feed).

In process 202, the home seller (e.g., a home builder, realtor, and/or agent, etc.) registers to utilize listing services provided by New Home Feed. A home seller could also include real estate brokers and/or advertising agencies for builders or brokers. In process 204, the listing information is entered by the builder or agent via the builder's website or directly via the New Home Feed site and/or via the customer relationship management (CRM) program.

In process 206, the listing information can be automatically uploaded to the host site (e.g., New Home Feed) when it is updated via the builder's website. In process 208, regional and national listing websites (both free and paid sites) are recommended using the listing information and presented to the builder, broker, and/or agent. In process 210, the host can designate certain sites as being recommended based on, for example, the geographical locale of the listings.

In process 212, the home seller can select the listing websites it wishes to use to market the properties or listings to potential buyers and/or realtors. In process 214, the listings are automatically pushed to the free sites selected by the home seller. The listings are typically uploaded to paid sites after a payment arrangement has been implemented. In some instances, this process is performed directly between the site representative and the home seller. For example, the paid sites can be notified by the host that a customer is interested in listing with their sites, and in process 216, representatives from the selected paid sites contact the home seller to set up accounts. The paid sites can utilize, for example, an admin panel provided by the host to respond to the home seller regarding pricing.

Using an admin panel, the customer can accept pricing, channel terms and activate an account with the paid site. The accounts can be set up such that the home seller can directly transfer funds due to the paid site. In some instances, the home seller can set up a payment account pay fees to the paid sites through the host web site.

In process 218, the representatives from the selected paid sites notify New Home Feed of account activation and New Home feed can push the listings to the paid sites in process 220. Once listings have been posted, the builder can update information about availability, pricing changes, amenities, etc., directly via the builder's website. This information can then automatically be pushed to each of the multiple listing websites selected by the home seller.

Figure 3:
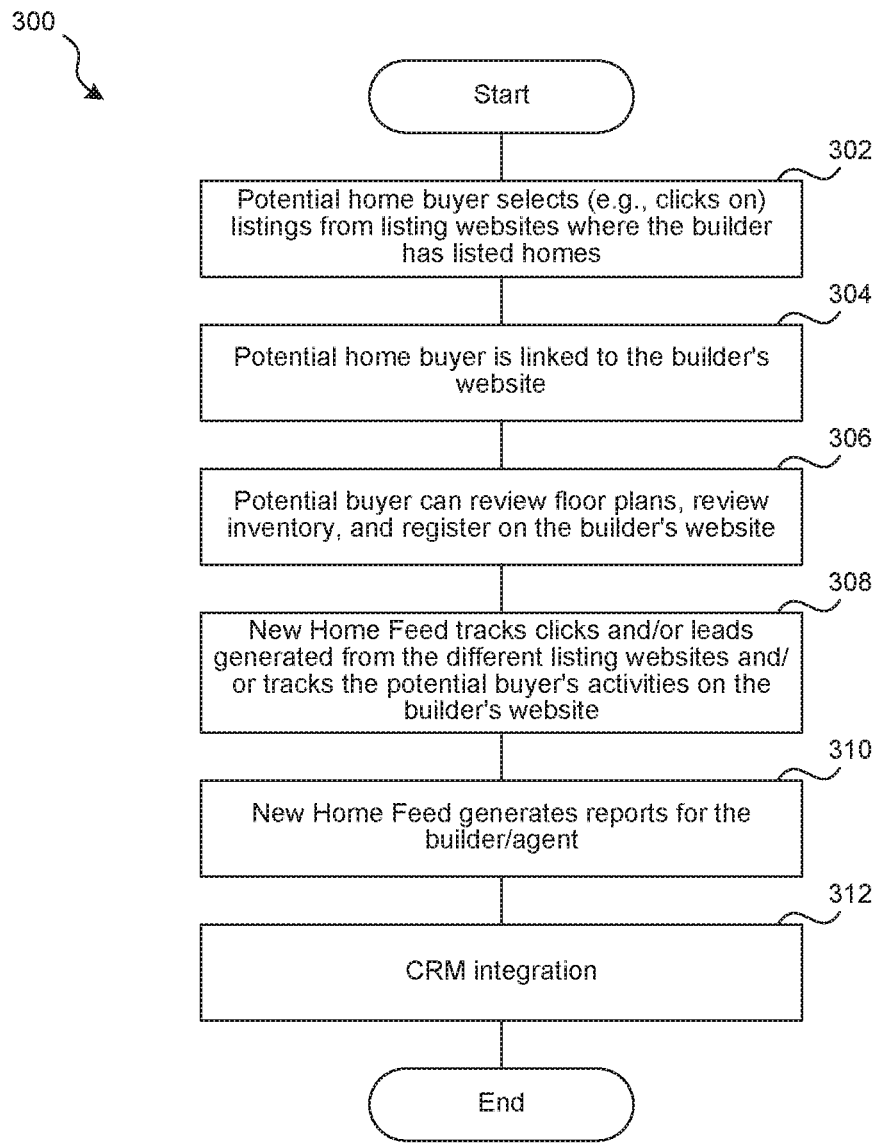
FIG. 3 depicts a flow chart showing an example process for tracking leads from each of the listing websites and generating lead reports for home sellers that list homes through the host site.

FIG. 3 depicts a flow chart showing an example process for tracking leads from each of the listing websites and generating lead reports for home sellers that list homes through the host site.

In process 302, a potential home buyer selects (e.g., clicks on) listings from listing websites where the builder has listed homes.

In process 304, the potential home buyer is directly linked to the builder's website. Since the builder's website often has the most up-to-date information, it is advantageous for the system to direct the potential buyer to the builder's site for additional information rather than keeping the buyer on the listing website.

In process 306, the potential buyer reviews floor plans, inventory, availability, and other listing information via the builder's website. The potential buyer can also register for the mailing list or e-newsletter on the builder's website. In process 308, the host (e.g., New Home Feed) can track leads (e.g., via clicks) generated from each listing website. The host can also track the potential buyer's browsing activities on the builder's website.

In process 310, the host generates reports for the builder/agent. The report can include information tracking reports summarizing meaningful actions (e.g., conversions), lead management, lead capturing and tracking tools/data. The reports can also include statistics about different listing websites for the home seller to evaluate their efficacy (e.g., where leads are coming from). This information can be exported, organized, and/or printed by the home seller. The host can also provide lead communication tools to the home seller. The report can be generated and viewed via a dashboard for the home seller to monitor buyer conversions. Moreover, the sending of graphic-rich, HTML emails to leads can be managed using the dashboard as well.

In process 312, the captured leads are integrated into a CRM program. For example, the information captured by the host regarding potential home buyers during pre-sales can be automatically migrated for post-sale management of customers/buyers. This feature allows home sellers to manage potential home buyers through and during the post-sales process.

Figure 4:
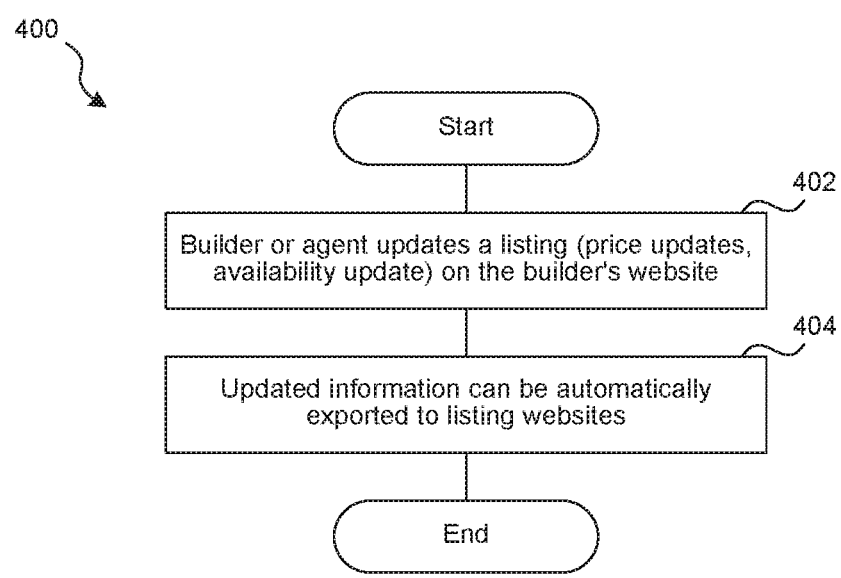
FIG. 4 depicts a flow chart showing an example process for the home seller to update listing information through the host site.

FIG. 4 depicts a flow chart showing an example process for the home seller to update listing information through the host site.

In process 402, the home seller (e.g., builder or agent) updates a listing on the builder's website. In process 404, this updated information can be automatically exported to the listing websites.

FIG. 5 depicts a screenshot of an example XML file for a home feed. Under a traditional framework, a user would have to peruse the example XML file to troubleshoot why the home feed "breaks" or does not work with a particular listing channel.

Figure 6:
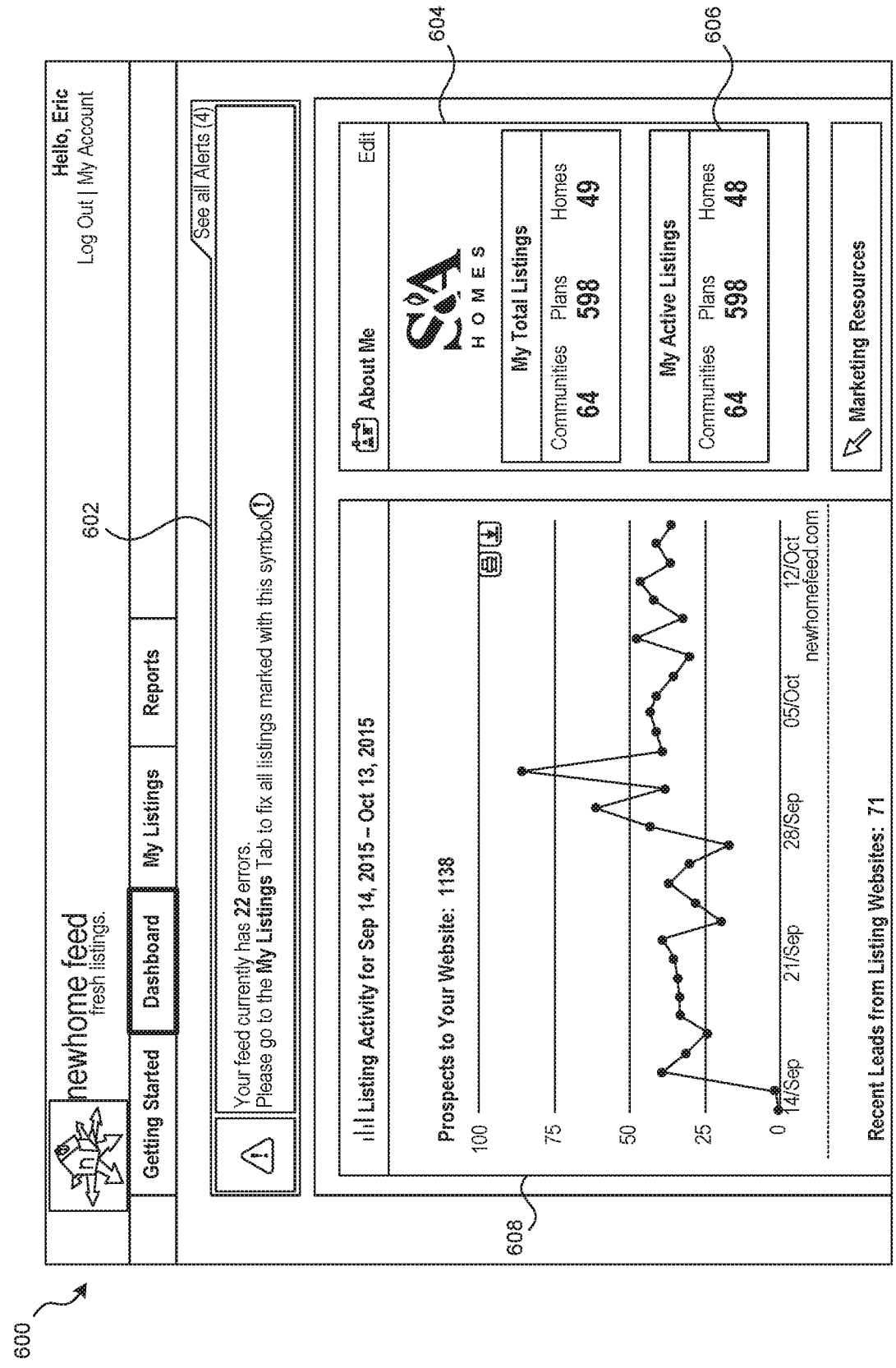
FIG. 6 depicts a screenshot of an example dashboard of the online marketing platform that provides marketing services and features to home sellers.

FIG. 6 depicts a screenshot of an example dashboard 600 of the online marketing platform that provides marketing services and features to home sellers. The features can include, for example, validation and optimization as discussed above. On the dashboard 600 is an error counter 602 that summarizes the number of errors included in a given set of listing errors. The listing errors are those associated with the prebuilt listings on the marketing platform before each listing is forwarded to Internet property listing services for actual publication.

In addition, the dashboard 600 also includes a total listing counter 604 and an active listing counter 606. The total listing counter 604 includes all listings that are in progress and published, whereas the active listing counter 606 counts only those listings that are currently being forwarded to Internet property listing services. The active listing counter 606 is sometimes misleading in that property listing services will sometimes not publish listings with errors. So even if a given listing is listed as active, if that listing has an error it may not be published; however, that listing is likely being paid for regardless of errors.

Finally, the dashboard 600 includes an effectiveness chart 608, which shows the amount of traffic that active listings are receiving. This effectiveness chart 608 can be drilled down into to view particular property listing services in more granular detail.

FIG. 7 depicts a screenshot illustrating a user interface for detecting errors in listings by use of a validation engine. As illustrated, the disclosed technology enables a user to visually see all errors in the user's listings, and easily troubleshoot those errors without having to deal with the complexity of XML files (e.g., the file shown in FIG. 5).

The error interface 700 displays three levels of hierarchy for property listings. The highest level is the community level 702. The community level 702 refers to an entire housing development. Within a given development is the plan level 704. The plan level 704 refers to housing plans that are available for a given development. Often, early on in development, a developer is willing to build any of a set of plans in any of the lots for a given development. The buyer chooses a lot, then a plan.

This fact is relevant to listing services because Internet listing services often do not include postings that are not specific houses because there is missing data (i.e., a specific address of the house) and thus the listing has errors and will not post. The marketing platform here provides a way around that problem. The third level is the specific home level 706. Specific homes are those which are already built within a development and therefore already have a chosen plan and address.

The error interface 700 also includes error alerts 708. The error alerts 708 appear to the side of the hierarchy of listings, and at each level the error is applicable. FIG. 7 shows an error alert 708 related to a specific house. Therefore, the error alert 708 shows up at the community level 702, the plan level 704 and the specific home level 706.

Additionally shown in the error interface 700 are listing toggle buttons 710 that turn a given listing on or off from active status. Listings that are considered active are actively forwarded to property listing services. Listings that are not active are not forwarded. This feature is relevant to calculating costs: non-active listings are not forwarded to external services and thus do not incur costs from the external listing services. The error interface 700 also displays some basic information 712 about the listings.

Figure 8B:
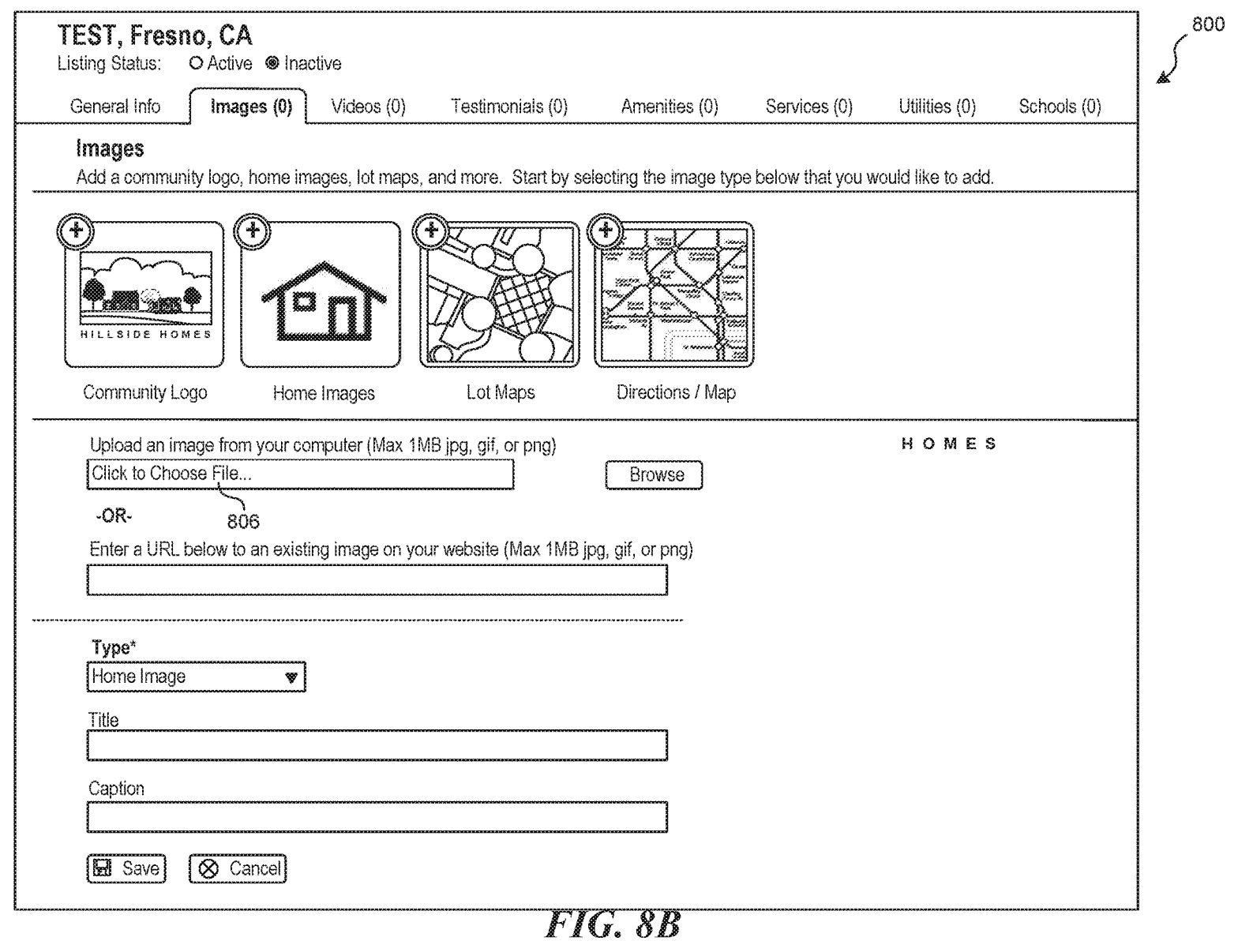
Figure 8C:
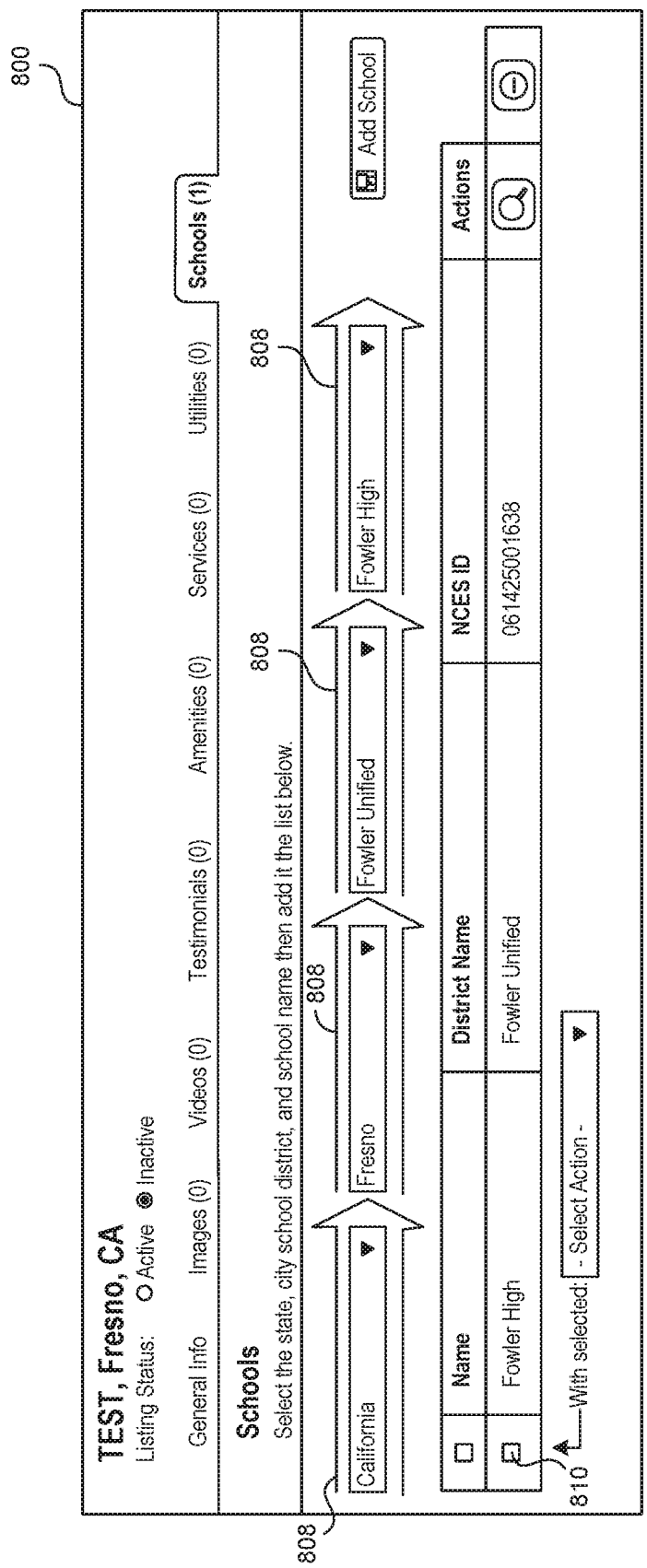
Figure 8D:

FIGS. 8A-D depict screenshots of data input for generating property listings. Shown in FIGS. 8A-C, a user is enabled to update data entry on the community level 702. The data entry interface 800 includes a pane bar 802 that determines the kind of data for a listing that the user intends to input. Shown on the pane bar 802 is a horizontal list of various kinds of data about a the listings, including general info, images, videos, testimonials, amenities, services, utilities, and local schools. In many of these panes, data is entered into text fields 804. Other input methods include file insertion fields 806, drop-down menus 808, and toggles 810. FIG. 8D shows a user enabled to update data on a specific home level 706.

FIG. 9 depicts a screenshot of a property listing service selection interface. The service selecting interface 900 includes a list of Internet property listing services 902 to which the marketing platform can forward property listings. Each property listing service 902 includes a coverage theme 904. In this particular screenshot, the coverage theme 904 is based on geographical region. In other embodiments, the coverage theme 904 could cover other categories, such as luxury property, retirement property (or property with an age minimum or maximum), and resort property (such as close to a ski mountain or golf course).

Figure 10:
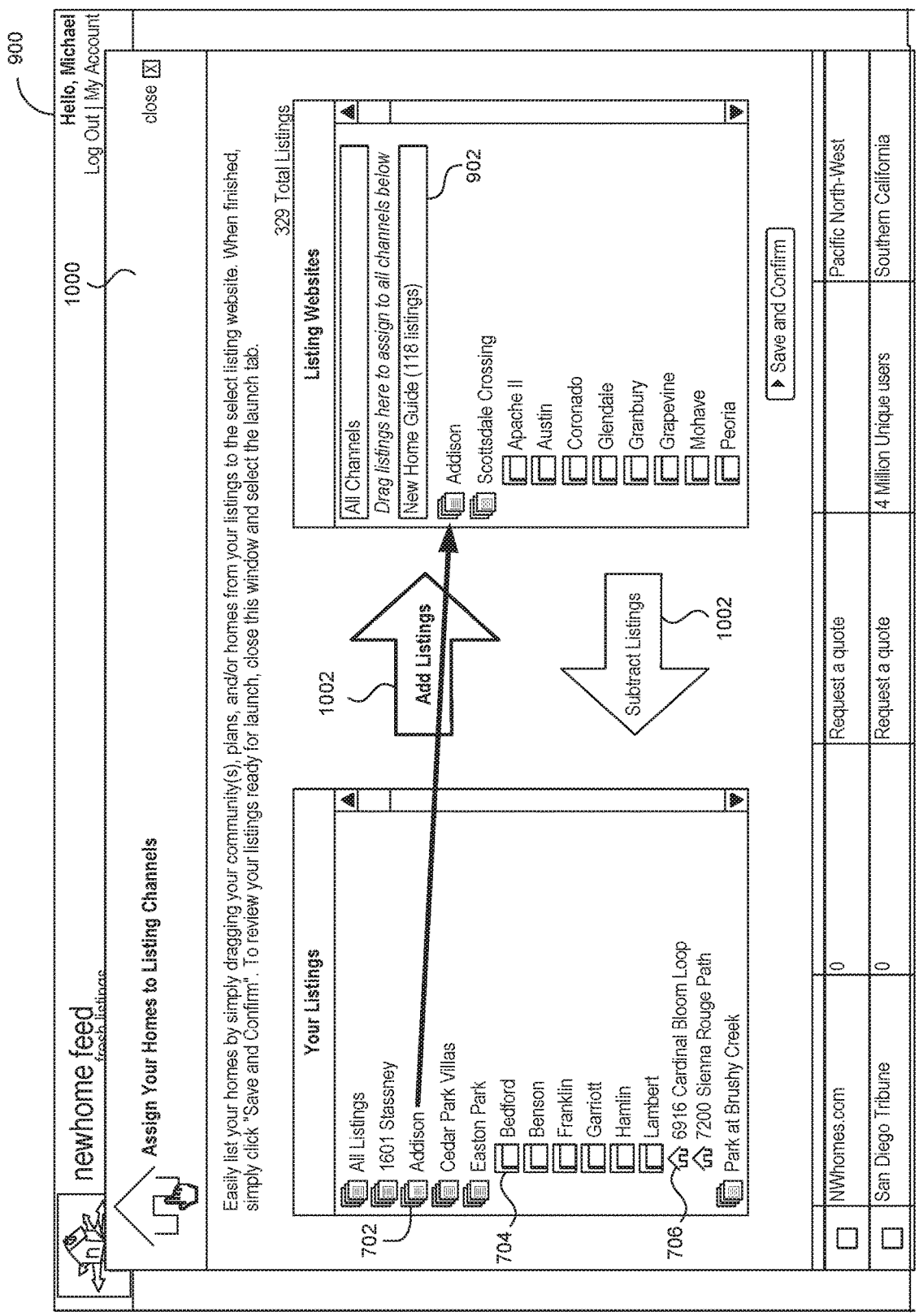
FIG. 10 depicts a screenshot of selecting property listings to forward to a given property listing service.

FIG. 10 depicts a screenshot of the system selecting property listings to forward to a given property listing service. Pictured is a selection screen 1000 for selecting particular listings to push to a chosen property listing service 902. Each listing level 702, 704, and 706 is displayed, and through selection buttons 1002, a user determines which listings to push to the chosen property listing service 902.

Furthermore, an Addendum is included to depict screenshots showing various examples of user interfaces of the online marketing platform in accordance with various embodiments of the disclosed technology.

Referring now generally to the figures depicting various screens of the interface, such screens combine together to generate an overall user experience. An example of a user of embodiments disclosed herein is a community developer. The community developer owns zoned land and has prepared a plurality of lots within the zoned land for housing.

Often, developers are more interested in selling houses on the lots than the exact configuration of the community. Accordingly, the developer will sell the lot with a number of choices of floor plans that are available within the community. Each floor plan has a number of varying details. Thus, interested home buyers may select a lot and then choose a floor plan to have built on that lot.

In this example embodiment, a developer generates property listings, fills in required fields, selects services to push the listings to, checks for errors in the listing code, and updates all listings across all listing services accordingly. Thus, a developer is able to advertise listings across many different services and correct errors on those listings centrally.

A builder would activate an account and start entering in development communities to sell. Property listings are displayed in a hierarchy of levels. Each development community is represented on the interface as a top level division. Within each community there is a subdivision for the floor plans available in that community. Within the floor plans, those that have actually been physically built are represented as specific built homes. Other divisions are possible as well, such as dividing up a duplex or specific apartments in an apartment building. Each entry in the hierarchy or subdivision constitutes a property listing—each may be delivered out to a listing service when selected as an option.

The user is enabled to enter into fields data associated with each property listing in these subdivisions. The entry fields include text data entry (i.e., price, floors, bathrooms, rooms, square footage, included appliances, included community benefits, etc.), hyperlinks (developer/seller website, etc.), file uploads (such as images, floor plans, CAD files, 3D model files, spreadsheets, and fliers), and buttons (such as clickable buttons, radio buttons, checkboxes, etc.).

In addition to generating the GUI-based listings, on another screen (see FIG. XX) the user selects from a number of property listings services across the Internet that it wishes to have its property listings displayed on. Some of the listing services are paid, some are free, some are of general interest, and others have themes. The themes often relate to the location (geographical regions) or style (luxury, community flavors such as young-professional or retirement, high-rise, custom built, golf course adjacent, exclusive amenity adjacent, etc.) of the housing listed.

Once the services for posting the property listings are selected, the code generator generates property listing code. The listing code may be in a plurality of languages such as XML, Java, Python, SQL, Go, C, C++, or other suitable languages known in the art. The code is generated from the entry fields previously filled in by the developer/user. The code is generated according to a specification or format designated by each individual listing service. Each listing service that is selectable by the user is supported by the code generator. Supporting a given listing service refers to having programmed code generation intended to match the website code of the given listing service.

After the code is generated, a code validator inspects the code. Errors in the code appear as alerts on the screen, noting where the user can amend the entry fields to fix the code error. Errors include empty fields, fields with bad syntax (e.g., the field expects a number rather than letters, special characters that are not permitted are used, inconsistent information with another field is provided, etc.), broken or dead hyperlinks, incompatible files intended for upload, file locations not found (null pointer), or corrupted file. Programmers will find this function similar to code validators used in Integrated Development Environments (such as Eclipse). However, where IDEs are intended to be understood by programmers, the interface disclosed here does not require the user to bring specialized interpretation skills. The alerts posted by the erroneous fields in the GUI are in a conversational language (e.g., English, Spanish, Mandarin, French, etc., and thus clearly instruct the user how to fix the error.

Once the error is fixed on the GUI, the code generator amends the code files that are to be supplied to the plurality of selected listing services. Therefore, rather than the user being required to read one or more coding languages and having to parse through thousands of lines of code to find errors, the listings are all repaired in a single location.

When the user enables a given property listing to be "active," the current code files are transmitted to the selected listing services for that property listing, and those listing services create listings based on the information in the entry fields. When the entry fields are updated, all of the listing service postings are also updated.

In the industry of posting on listing service websites, there is an issue when the listing services are provided information to post that is erroneous or incomplete. Often, these web services simply will not post an incomplete property listing because it makes their website look shoddy. Developers have to then pester the listing service individually to go and correct the errors and host the property listing. However, using the example of the embodiment described, the errors in code are located and fixed by the user immediately.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the terms "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions that are set at various times in various memory and storage devices in a computer and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., compact disk read-only memory (CD ROMs), digital versatile discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above detailed description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above detailed description explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method for identifying errors in listing generator application code comprising:
    generating a hierarchy of property listings for a set of property developments, wherein the highest level of the hierarchy includes data items concerning a first property development in the set of property developments, and the lowest level of the hierarchy includes data items concerning specific units of property within the first property development;
    tracking web browsing activities of at least one potential buyer;
    receiving user selections of one or more Internet property listing services from among a plurality of Internet property listing services;
    for each selected Internet property listing service:
        generating, by at least one processor, a first version of one or more property development code files for the first property development, wherein the first version of the one or more code files is readable by the selected Internet property listing service according to specifications corresponding to the selected Internet property listing service,
        validating, by the at least one processor, the first version of the one or more property development code files for the first property development,
        in response to the validating identifying at least one error, in the first version of the one or more property development code files, relating to a distinguished unit of property in the first property development:
            causing at least one alert to be displayed, at each of a plurality of levels of the hierarchy, proximate to an entry field related to the distinguished unit of property; and
            receiving user input correcting the at least one identified error;
            in response to receiving the user input, generating, by the at least one processor, a second version of the one or more code files for the first property development, wherein the second version of the one or more code files is readable by the selected Internet property listing service according to the specifications corresponding to the selected Internet property listing service, and wherein the second version of the one or more code files incorporates the received user input correcting the at least one identified error;
            validating, by the at least one processor, the second version of the one or more code files for the first property development; and
            transmitting the second version of the one or more code files for the first property development to the selected Internet property listing service.

2. The method of claim 1, further comprising:
    in response to receiving the user input, removing the at least one alert.

3. The method of claim 1, wherein the hierarchy of property listings comprises at least one intermediate level between the highest level of the hierarchy and the lowest level the hierarchy, wherein the at least one intermediate level of the hierarchy corresponds to a plan available within the property development.

4. The method of claim 1, further comprising:
    causing the list of Internet property listing services to be displayed according to a theme to which each Internet property listing services adheres to, and wherein the theme is one or more of:
        luxury property,
        retirement property,
        resort property, or
        property within a geographical region.

5. The method of claim 1, wherein at least one of the Internet property listing services is accessed through a paywall, and wherein the method further comprises:
    for each paywall accessible Internet property listing service:
        receiving user information to setup an account with the paywall accessible Internet property listing service, wherein the user information comprises financial account information of a user;
        transmitting the received user information to the paywall accessible Internet property listing service; and
        upon receiving confirmation from the paywall accessible Internet property listing service of successful user account setup,
            transmitting the second version of the one or more code files for the property development to the paywall accessible Internet property listing service.

6. The method of claim 1, further comprising:
    for each of the one or more Internet property listing services, determining a listing effectiveness of the Internet property listing service.

7. The method of claim 6, further comprising:
    for each of the one or more Internet property listing services,
        causing to be displayed, proximate to the one or more Internet property listing service, an indication of the listing effectiveness determined for the Internet property listing service.

8. The method of claim 6, wherein the list of Internet property listing services is sorted based on the determined listing effectiveness of each of the one or more Internet property listing services.

9. The method of claim 6, wherein each listing effectiveness is determined based on:
    statistics on potential home buyer browsing activity at the corresponding Internet property listing service,
    geographical location of the property development,
    or any combination thereof.

10. The method of claim 1, wherein at least one identified error includes at least one empty field, at least one field with bad syntax, at least one broken or dead hyperlink, at least one incompatible file intended for upload, at least one file location not found, and at least one corrupted file.

11. A system for identifying errors in listing generator application code comprising a computer-readable medium having instructions stored thereon, which, in response to being executed by one or more processors of the system, cause the system to:
    generate a hierarchy of property listings for a set of property developments, wherein the highest level of the hierarchy includes data items concerning a first property development in the set of property developments, and the lowest level of the hierarchy includes data items concerning specific units of property within the first property development;

receive user selections of one or more Internet property listing services;

for each selected Internet property listing service:
   generate, by at least one of the one or more processors, a first version of one or more property development code files for the first property development, wherein the first version of the one or more code files is readable by the selected Internet property listing service according to specifications corresponding to the selected Internet property listing service,
   validate, by at least one of the one or more processors, the first version of the one or more property development code files for the first property development,
   in response to the validation identifying at least one error, in the first version of the one or more property development code files, relating to a distinguished unit of property in the first property development:
      cause at least one alert to be displayed, at each of a plurality of levels of the hierarchy, proximate to an entry field related to the distinguished unit of property; and
      receive user input correcting the at least one identified error;
      in response to receiving the user input, generate, by at least one of the one or more processors, a second version of the one or more code files for the first property development, wherein the second version of the one or more code files is readable by the selected Internet property listing service according to the specifications corresponding to the selected Internet property listing service, and wherein the second version of the one or more code files incorporates the received user input correcting the at least one identified error; and
      transmit the second version of the one or more code files for the first property development to the selected Internet property listing service.

12. The system of claim 11, wherein the instructions, in response to being executed by the one or more processors of the system, further cause the system to:
   in response to receiving the user input, remove the at least one alert.

13. The system of claim 11, wherein the hierarchy of property listings comprises at least one intermediate level between the highest level of the hierarchy and the lowest level of the hierarchy, wherein the at least one intermediate level of the hierarchy corresponds to a plan available within the first property development.

14. The system of claim 11, wherein the instructions, in response to being executed by the one or more processors of the system, further cause the system to:
   cause a list of Internet property listing services to be displayed according to a theme to which each Internet property listing services adheres to, and wherein the theme is one or more of:
      luxury property,
      retirement property, or
      resort property.

15. The system of claim 11, wherein at least one of the Internet property listing services is accessed through a paywall, and wherein the instructions when executed by the one or more processors of the system further cause the system to:

for each paywall accessible Internet property listing service:
   receive user information to setup an account with the paywall accessible Internet property listing service, wherein the user information comprises financial account information of a user;
   transmit the received user information to the paywall accessible Internet property listing service; and
   upon receiving confirmation from the paywall accessible Internet property listing service of successful user account setup,
      transmit the second version of the one or more code files for the property development to the paywall accessible Internet property listing service.

16. The system of claim 11, wherein the instructions, in response to being executed by the one or more processors of the system, further cause the system to:
   determine listing effectiveness of each of the one or more Internet property listing services.

17. The system of claim 16, wherein the instructions, in response to being executed by the one or more processors of the system, further cause the system to:
   cause to be displayed an indication of at least one determined listing effectiveness proximate to the Internet property listing service for which the at least one determined listing effectiveness was determined.

18. The system of claim 16, wherein the list of Internet property listing services is sorted based on the determined listing effectiveness of each of the one or more Internet property listing services.

19. The system of claim 16, wherein each listing effectiveness is determined based on:
   statistics on potential home buyer browsing activity at the corresponding Internet property listing service,
   geographical location of the property development,
   or any combination thereof.

20. A computer program product for identifying errors in listing generator application code, the computer program product being embodied in a non-transitory computer readable medium and comprising computer instructions for:
   generating a hierarchy of property listings for a set of property developments, wherein the highest level of the hierarchy includes data items concerning a first property development in the set of property developments, and the lowest level of the hierarchy includes data items concerning specific units of property within the first property development;
   receiving user selections of one or more Internet property listing services;
   for each selected Internet property listing service:
      generating, by at least one processor, a first version of one or more property development code files for the first property development, wherein the first version of the one or more code files is readable by the selected Internet property listing service according to specifications corresponding to the selected Internet property listing service,
      validating, by the at least one processor, the first version of the one or more property development code files for the first property development,
      in response to the validating identifying at least one error, in the first version of the one or more property development code files, relating to a distinguished unit of property in the first property development:

causing at least one alert to be displayed, at each of a plurality of levels of the hierarchy, proximate to an entry field related to the distinguished unit of property; and receiving user input correcting the at least one identified error; and in response to receiving the user input, generating and validating, by the at least one processor, a second version of the one or more code files for the first property development, wherein the second version of the one or more code files is readable by the selected Internet property listing service according to the specifications corresponding to the selected Internet property listing service, and wherein the second version of the one or more code files incorporates the received user input correcting the at least one identified error.

21. The computer program product of claim 20, wherein at least one of the Internet property listing services is accessed through a paywall, further comprising computer instructions for:

for each paywall accessible Internet property listing service:

receive user information to setup an account with the paywall accessible Internet property listing service, wherein the user information comprises financial account information of a user;

transmit the received user information to the paywall accessible Internet property listing service; and upon receiving confirmation from the paywall accessible Internet property listing service of successful user account setup, transmit the second version of the one or more code files for the property development to the paywall accessible Internet property listing service.

22. A method for identifying errors in listing generator application code comprising:

generating, by at least one processor, a first version of one or more property development code files for a first property development, wherein the first version of the one or more code files is readable by a first Internet property listing service according to specifications corresponding to the first Internet property listing service;

validating, by the at least one processor, the first version of the one or more property development code files for the first property development; and in response to the validating identifying at least one error, in the first version of the one or more property development code files, relating to a distinguished unit of property in the first property development:

causing at least one alert to be displayed, at each of a plurality of levels of a hierarchy of property listings, proximate to an entry field related to the distinguished unit of property.

23. The method of claim 22, wherein at least one entry field related to the distinguished unit of property includes identifying information for the distinguished unit of property, wherein the identifying information for the distinguished unit of property includes a street address for the distinguished unit of property so that the causing at least one alert to be displayed comprises causing at least one alert is displayed proximate to the at least one entry field corresponding to the distinguished unit of property includes identifying information for the distinguished unit of property.

24. The method of claim 23, wherein the identifying information for the distinguished unit of property includes a price associated with the distinguished unit of property so that the at last one alert is caused to be displayed proximate to the entry field that includes the price associated with the distinguished unit of property and wherein the identifying information for the distinguished unit of property includes a date associated with the distinguished unit of property so that the at least one alert is caused to be displayed proximate to the entry field that includes the date associated with the distinguished unit of property.

* * * * *

UNITED STATES PATENT AND TRADEMARK OFFICE
CERTIFICATE OF CORRECTION

PATENT NO. : 11,023,937 B2  
APPLICATION NO. : 14/970208  
DATED : June 1, 2021  
INVENTOR(S) : Phillips et al.

Page 1 of 1

It is certified that error appears in the above-identified patent and that said Letters Patent is hereby corrected as shown below:

In the Drawings

Sheet 10 of 13, in Figure 8C, Line 6, delete "it the" and insert -- it to the --, therefor.

In the Specification

Column 5, Line 58, delete "JDOInstruments," and insert -- JDO Instruments, --, therefor.

Column 10, Line 33, delete "a the" and insert -- the --, therefor.

Column 11, Line 36, delete "XX" and insert -- 9 --, therefor.

In the Claims

Column 16, Line 4, Claim 3, after "level" insert -- of --.

Column 20, Line 31, Claim 24, delete "last" and insert -- least --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*